United States Patent [19]
Matsuda et al.

[11] Patent Number: 5,834,762
[45] Date of Patent: Nov. 10, 1998

[54] IMAGE READING APPARATUS AND METHOD

[75] Inventors: Shinya Matsuda, Kyoto; Shinichi Fujii, Amagasaki, both of Japan

[73] Assignee: Minolta Co., Ltd., Osaka, Japan

[21] Appl. No.: 962,227

[22] Filed: Oct. 31, 1997

Related U.S. Application Data

[63] Continuation of Ser. No. 568,671, Dec. 7, 1995, abandoned.

[30] Foreign Application Priority Data

Dec. 13, 1994 [JP] Japan .................................. 6-333198

[51] Int. Cl.$^6$ ........................................................ H04N 1/40
[52] U.S. Cl. .......................... 250/208.1; 250/559.06; 358/474
[58] Field of Search .......................... 250/208.1, 234, 250/559.04, 559.05, 559.06, 559.07; 358/443, 474, 471

[56] References Cited

U.S. PATENT DOCUMENTS

| | | | |
|---|---|---|---|
| 5,084,611 | 1/1992 | Okisu et al. | 250/208.1 |
| 5,194,729 | 3/1993 | Okisu et al. | 250/222.1 |
| 5,276,530 | 1/1994 | Siegel | 358/443 |
| 5,352,883 | 10/1994 | Kitani et al. | 250/208.1 |
| 5,416,609 | 5/1995 | Matsuda et al. | 358/474 |
| 5,616,914 | 4/1997 | Matsuda | 250/208.1 |

FOREIGN PATENT DOCUMENTS

| | | |
|---|---|---|
| 60-254869 | 12/1985 | Japan . |
| 62-143557 | 6/1987 | Japan . |
| 2-272874 | 11/1990 | Japan . |
| 4-238457 | 8/1992 | Japan . |

*Primary Examiner*—Edward P. Westin
*Assistant Examiner*—Kevin Pyo
*Attorney, Agent, or Firm*—Sidley & Austin

[57] ABSTRACT

The image reading apparatus is able to execute two image density controls. In one image density control, the image density of the document is detected and adjusted based on the detection, and in the other image density control, the document height is detected and the image density of the document is adjusted based on the detected height. Either of the two image density controls is selected based on the type or the shape of the document for execution of the density control.

22 Claims, 13 Drawing Sheets

Smaller | Larger | Smaller $L_C$ : Brightness of Character Portion
$L_B$ : Brightness of Paper Surface

IMAGE READING APPARATUS AND METHOD

CROSS REFERENCE TO RELATED APPLICATION

This is a continuation of U.S. patent application Ser. No. 08/568,671 filed Dec. 7, 1995, now abandoned.

BACKGROUND OF THE INVENTION

1. Field of the Invention

This invention relates to an image reading apparatus and an image reading method, and in particular, to a reading apparatus and a reading method that read images on book documents or similar documents.

2. Description of the Related Art

Conventionally, in an image reading apparatus, the density of the read image is adjusted by feedback control of the lamp voltage that illuminates the document by means of detecting the light quantity reflected from the document during the read operation and setting that output to a constant value. Further, in an apparatus that carries out digital processing of image data, the light quantity reflected from the document is monitored and the image density in the image data adjusted in proportion to the monitored value.

Thereupon, generally, the density of the surface of the paper and the density of the image portion of the document that will be read differ greatly depending on the type of document. For example, the density of the surface layers of newspapers and old books becomes high due to the paper itself turning yellow. Moreover, the density of the characters which are images in documents written with pencils or colored pens becomes low. Even further, documents copied using a diazo type copying machine have both of these properties.

To counter changes in the density contrast occurring due to these types of document properties, there is an apparatus that obtains suitable image quality by means of creating a histogram that represents the document density distribution, judging the type of document based on that and then controlling the density in proportion to that judgment (for example, as disclosed in Japanese Laid-open patent application Hei 5-328129).

The density control is always carried out by a constant system in this type of conventional apparatus. While adjustments for the optimum image density are carried out in a document with character images which form the main characters in this type of conventional apparatus, adjustments for the optimum image density are not carried out in a document with halftone images such as photographic images.

Other types of reproduction systems, such as a camera type reading apparatus that reads documents from above are known. When reading documents such as books or flies with these systems, the density of the images that are read differ greatly due to changes in the height of the document surface caused by curving of the document surface, changes in the slope of the document surface or the reflection ratio of the document surface.

Because the illumination lamp of the apparatus illuminates the document from above, if the document is thick, the illumination lamp and the read sensor are close to the document surface making the quantity of light received by the sensor greater than a thinner document.

Also, the quantity of light received by the sensor changes due to curving of the document surface, the image density that will be reproduced in identical documents will be different which is not preferable.

SUMMARY OF THE INVENTION

This invention was developed taking these types of conditions into consideration and the purpose of this invention is to provide an improved image reading apparatus to resolve the above-mentioned poor conditions.

Another purpose of this invention is to provide an image reading apparatus that always carries out density control without being affected by the type of document image (character image or halftone image).

A further purpose of this invention is to provide an image reading apparatus that always carries out density control without being affected by the type or thickness of the document (book documents or sheet documents).

An even further purpose of this invention is to provide an image reading apparatus that always carries out density control without being affected by noise.

The purposes mentioned above are achieved by providing an image reading apparatus comprising an image reader which reads an image of a document to output image data, a density detection means for detecting the density of the document image, a height detection means for detecting height of the document, a first density control means for adjusting density level of the image data based on the density level of the document image detected by said density detection means, a second density control means for adjusting density level of the image data based on the document height detected by said height detection means, and a selection means for selecting one of said first and second height detection means so that the image data outputted by said image reader is adjusted by either density control means.

The purposes mentioned above are further achieved by providing an image reading method comprising steps of reading an image of a document to output image data, detecting the density of the document image, detecting height of the document, and executing either one of a first density control wherein the density level of the image data is adjusted based on the detected document density or a second density control wherein the density of the image data is adjusted based on the detected document height.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS (1) First Embodiment (1-1) Description of Entire Construction The embodiments of this invention is described referring to the accompanying drawings. FIG. 1 is a perspective view showing the entire construction of the image reading apparatus 1 in which this invention is applied and FIG. 2 is a perspective view showing the appearance when a book document is placed as the document to be read. The image reading apparatus 1 has a platen 2. When reading a document with a plurality of pages bound at one side such as a book or file (hereinafter this type of document is referred to as a book document), the desired page to be read is opened and set on the platen 2 facing upward. A camera device 3 is provided above the platen 2 that reads the document by means of an optical scan. A prescribed gap is maintained between the platen 2 and the camera device 3 and a work space is formed by this gap. Further, in the image reading apparatus 1 are provided an illumination portion 4 that illuminates the document and is arranged above and at the interior of the platen 2, a control panel 5 that sets the image reading conditions and other settings, a mirror 6 arranged along the platen 2 and at the interior of the platen 2 and which reflects the side surface of the interior of the document placed on the platen 2, a reference plate 6A identically arranged at the interior of the platen 2 and that functions as a positioning reference for the document, and a control portion shown in FIG. 8. Image data captured by means of the camera device 3 undergoes various processing by the control portion and is then output to a desired output device (printer, computer etc.).

Figure 1:
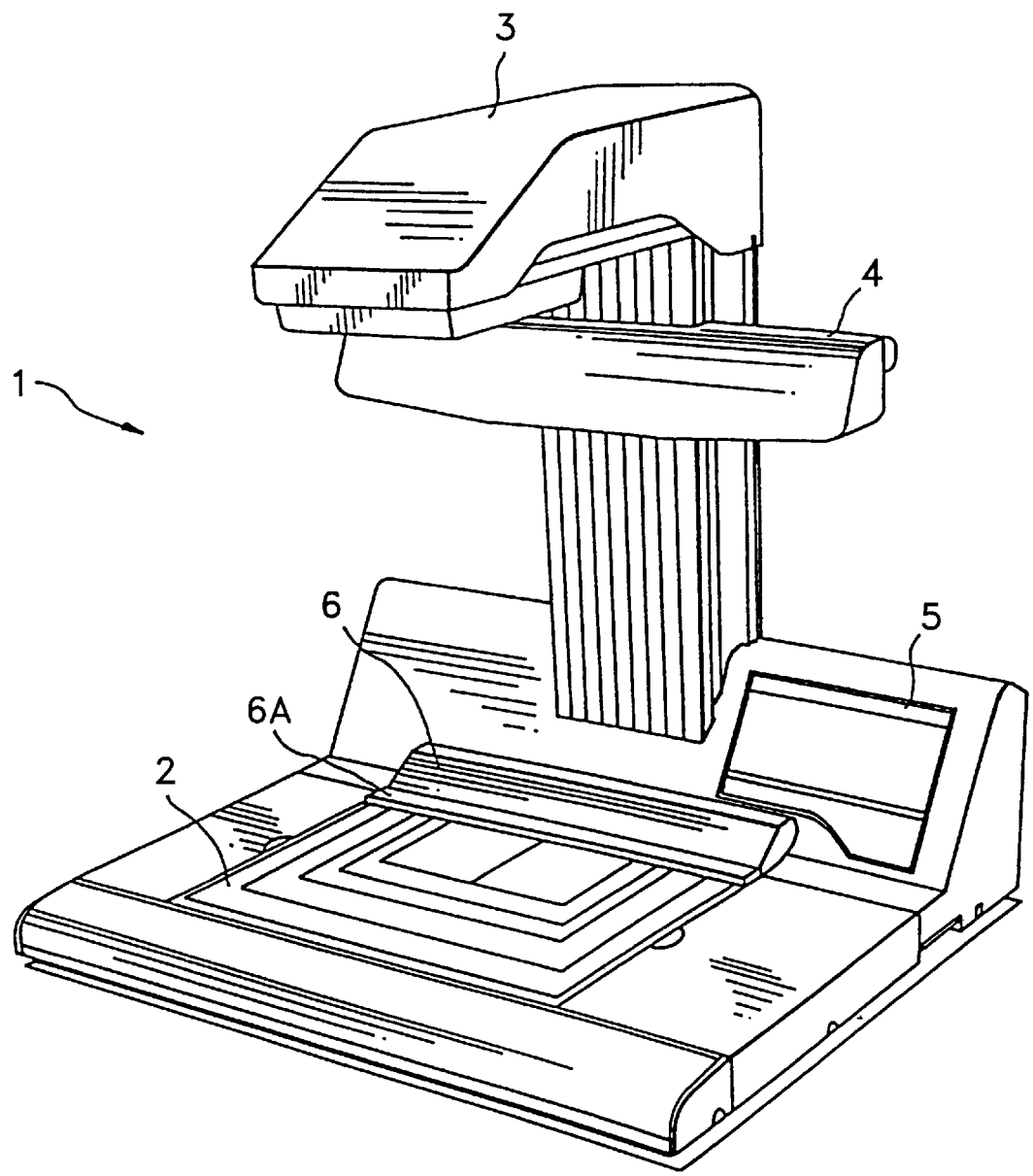
FIG. 1 is a perspective view of the image reading apparatus in which the present invention is applied.
Figure 2:
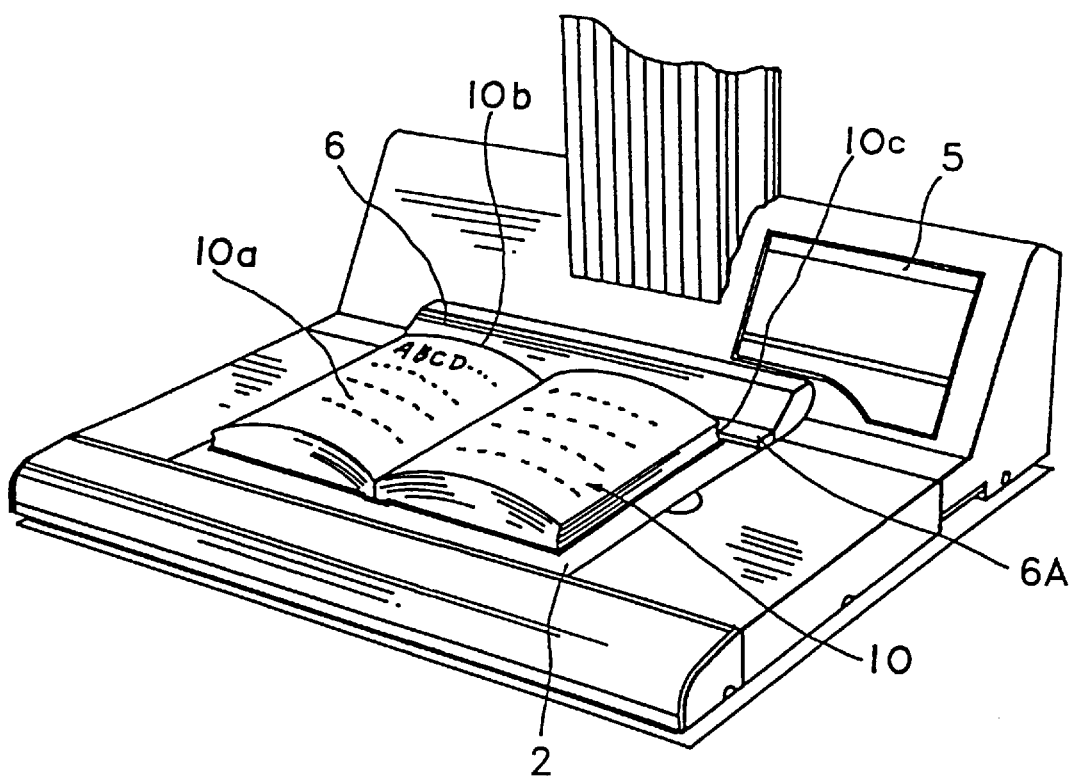
FIG. 2 is a perspective view showing the appearance when a book document is placed in the image reading apparatus.

Hereupon, the names of each portion of the book document 10 placed on the platen 2 are defined. The surface which is a region consisting of both the left and right pages of the opened book document 10 and which is read by the camera device 3 is called the document surface 10a. The side edge of the document surface 10a at the interior of the placed book document 10 is called the upper edge 10b and the side edge at the interior of the cover of the book document 10 is called the upper edge of the cover 10c.

Figure 3:
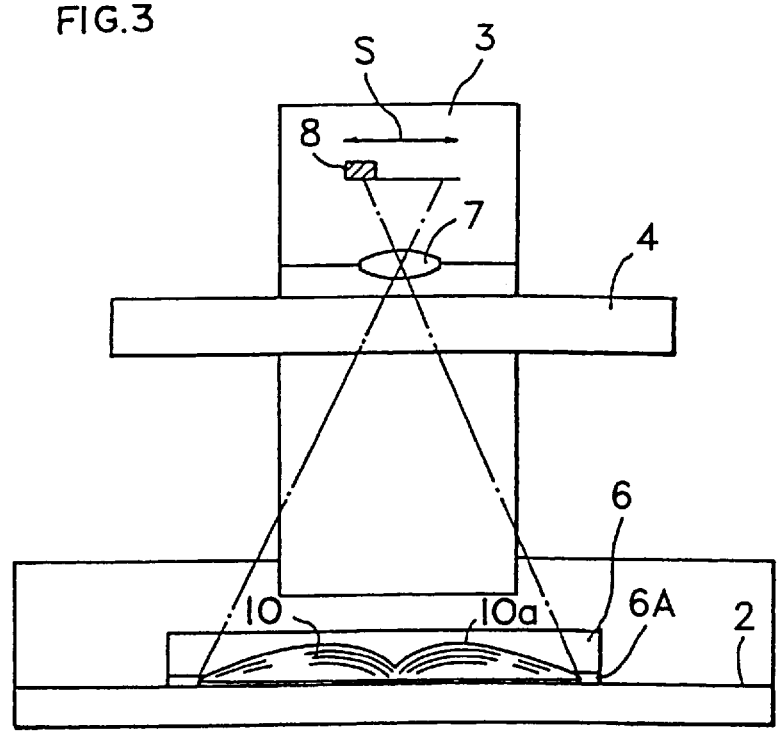
FIG. 3 is a plane view seen from the front of the image reading apparatus.
Figure 4:
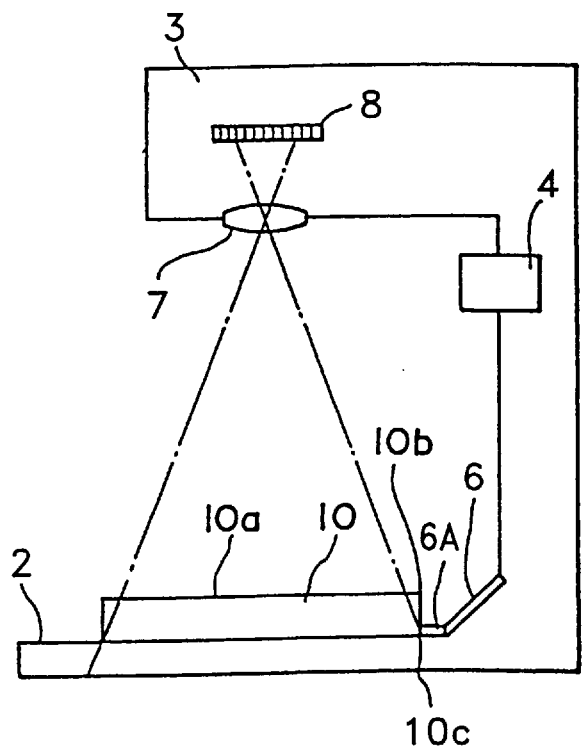
FIG. 4 is a plane view seen from the side of the image reading apparatus.

FIG. 3 and FIG. 4 are plane views seen from the front and from the side of the image reading apparatus 1. The camera device 3 comprises a CCD line sensor 8 consisting of a plurality of image pickup elements arranged in a line configuration from the front side to the interior (main scan direction) of the image reading apparatus 1 and a projecting lens 7 that condenses images from the document image placed on the platen 2 onto the line sensor 8. The line sensor 8 is moved in the subscan direction (direction indicated by arrow S in FIG. 3) at perpendicular to the main scan direction at the image forming surface where the document, image will be formed and then reads the image every line at each read position in the subscan direction. Further, the projecting lens 7 is installed to be movable in the optical axis direction by means of a lens drive circuit. The lens is moved in accordance with the height of the document obtained by means of a height detection described later and then forms the image of the document surface 10a on the line sensor 8 while always maintaining a focused state.

The book document 10 is positioned to coincide with the upper edge 10c of the cover at the reference position by placing the upper edge 10c of the cover on the platen 2 pressing against the reference plate 6A. Namely, the reference plate 6A protrudes from the document placing surface of the platen 2 at a thickness almost equal to that of the cover of the book document 10 and the upper edge 10c of the cover of the book document 10 presses against this protruding reference plate 6A thus the center portion of the document is matched to the center line of the platen 2 and placed on the platen. The mirror 6 extends in the subscan direction at the interior of the platen 2 and is arranged inclining at an angle of 45° with respect to the document placing surface of the platen 2 and reflects the side surface of the book document 10 placed on the platen 2. The side image of the book document 10 reflected by the mirror 6 is projected by the projecting lens 7 along with the document surface 10a. The line sensor 8 has a length sufficient to just read the images of the projected document surface 10a and side surface and the images of the document surface 10a and side surface are read simultaneously by the scanning movement. Moreover, although an apparatus is indicated that uses a line sensor in this embodiment, an area sensor can be used in place of this.

(1-2) Control Circuit

Figure 8:
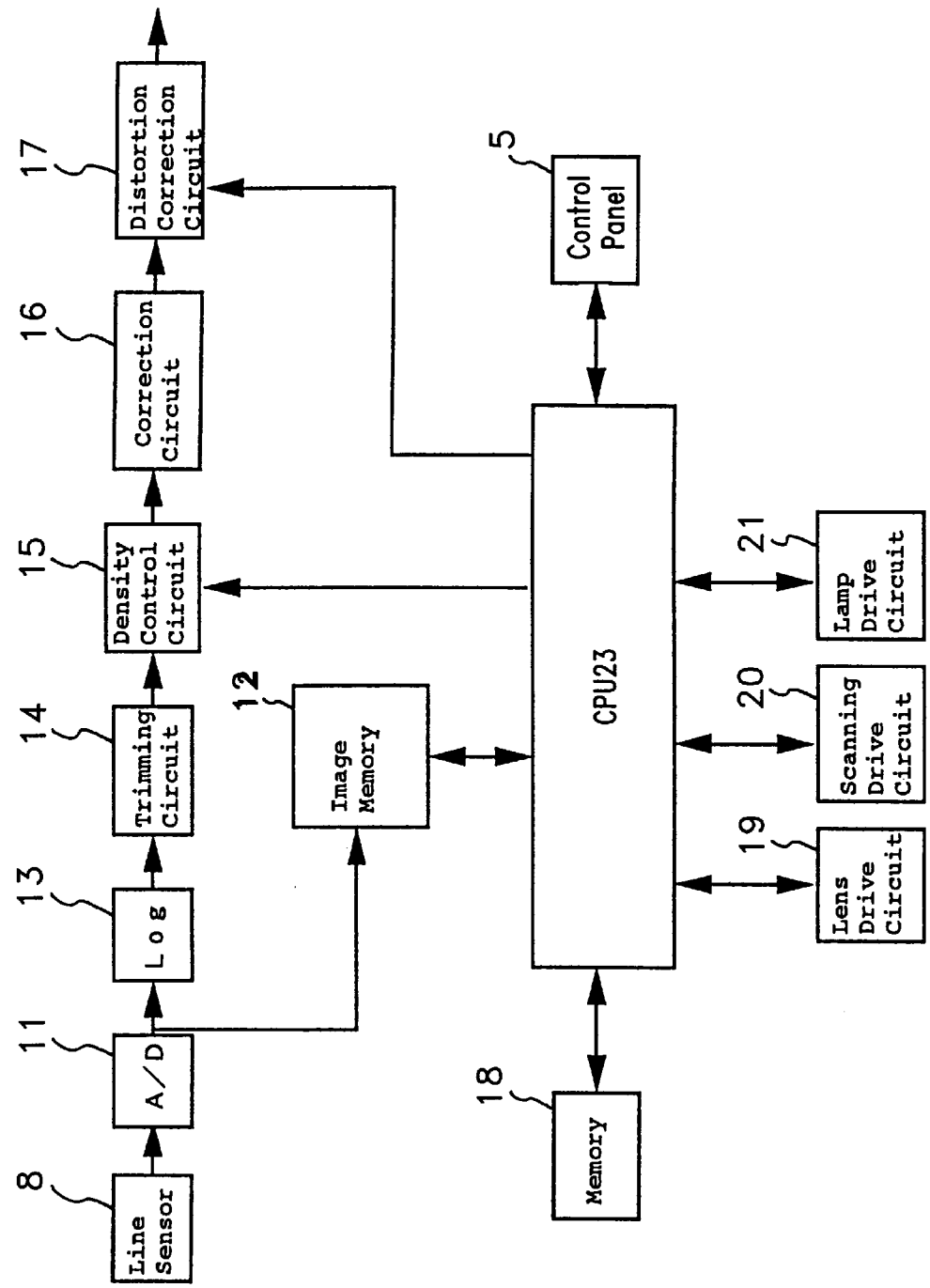
FIG. 8 is a block diagram of the control circuit of the image reading apparatus.

FIG. 8 is a block diagram of the control circuit of the image reading apparatus 1. In this embodiment, the line sensor 8 executes a preliminary scan to sample image data for the purpose of detecting the height of the document surface (described later) and controlling the density, before executing the scan operation (actual scan operation) of the actual image read.

The light reflected from the document 10 concentrated by means of the projecting lens 7 is formed into an image in the line sensor 8, converted to an electrical signal in proportion to that quantity of received light by the image pickup elements of the line sensor 8 and then is output to an A/D converter 11 in the arranged order of the image pickup elements. The electrical signals input to the A/D converter 11 are converted to digital image data and, during the preliminary scan, are output to an image memory 12 and, during the actual scan, are output to a trimming circuit 14 via a logarithm conversion circuit 13. The image memory 12 has a capacity that stores several lines of image data at a time that are input, and stores several lines of image data at a time in sequence obtained by the preliminary scan.

The image data output from the A/D converter 11 represents a level that is in proportion to the quantity of received light by the image pickup elements of the line sensor or in other words, represents the brightness level on the document surface thereby, this level is converted to an image density level by the logarithm conversion circuit 13. The conversion of the Log conversion circuit 13 is done with the following equation.

$$D = \log 1/L \quad D: \text{density value}, L: \text{brightness value}$$

Because the image data which is input as previously described also contains image data of the side surface of the book document 10, the trimming circuit 14 deletes the image data of the side surface, extracts only the image data of the document surface 10a and outputs that data to a density control circuit 15.

The density control circuit 15 adjusts the image density level by means of a density control process (described later). The image data in which the density level was adjusted undergoes a γ correction and a distortion correction by means of a γ correction circuit 16 and a distortion correction circuit 17 and is then output to an external device such as a printer or personal computer. The distortion correction mentioned here means that, because the image is distorted in proportion to curving of the document surface 10a when a book document 10 is placed, that distortion is corrected. Moreover, the γ correction will be described later.

In the figure, the CPU 23 is a microcomputer that controls the operation of the reading apparatus. The CPU 23 sequentially reads the image data stored in the image memory 12 one line at a time and then detects the height of the document surface 10a at each read position based on this image data together with detecting the brightness level of the image data corresponding to the image portion of each line and the brightness level of the image data corresponding to the surface of the paper of the document surface then stores the resulting data in a memory 18. Further, the CPU 23 provides the density control circuit 15 with the height data and the density level data stored in the memory 18 to control the density level adjustment of the image data that is executed by the density control circuit 15. The CPU 23 further outputs the control signals to a lens drive circuit 19 and the lens is moved in response to the read position of the line sensor 8 to always form the images of the document surface 10a in a focused state on the line sensor 8. Furthermore, the CPU 23 outputs the control signals to a scanning drive circuit 20 and a lamp drive circuit 21 to control the scanning movement of the line sensor and the lighting of the lamp of the illumination portion 4.

(1-3) Height Detection of the Document Surface

When the book document 10 is placed on the platen 2 facing upward in an opened state, each left and right page of the document surface 10a become spatially curved. Consequently, the distance between the line sensor 8 and the document surface 10a of the book document 10 changes in response to each read position in the subscan direction thus, making it necessary to adjust the focus of the lens 7 at each read position and correct for distortion of the read image. In this reading apparatus 1, the height of the document surface 10a of the book document 10 from the platen 2 is detected at each read position and based on these detection results, focus adjustments and distortion corrections are carried out.

Figure 5:
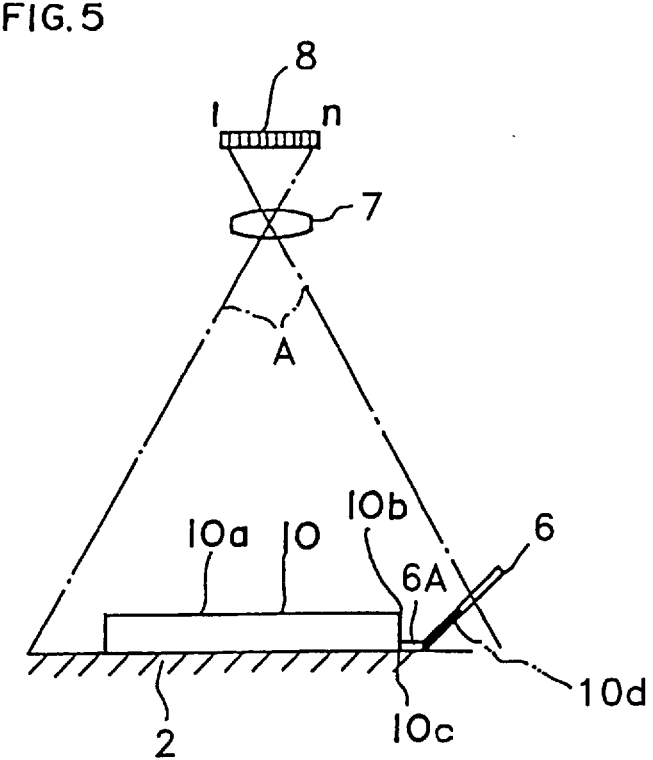
FIG. 5 shows the reading range of the line sensor used in the image reading apparatus.

FIG. 5 shows the principle of the height detection process used in the image reading apparatus 1. By placing the book document 10 at a prescribed position, the side surface image 10d of the book document 10 is reflected on the mirror 6. The distribution of the document height is obtained by reading this side surface image 10d using the line sensor 8. Moreover, in FIG. 5, the read range of the line sensor 8 is shown by the dot-dash line A and the address of the image pickup elements of the line sensor 8 is shown by 1 to n in order from the left of the surface of the paper.

Figure 6:
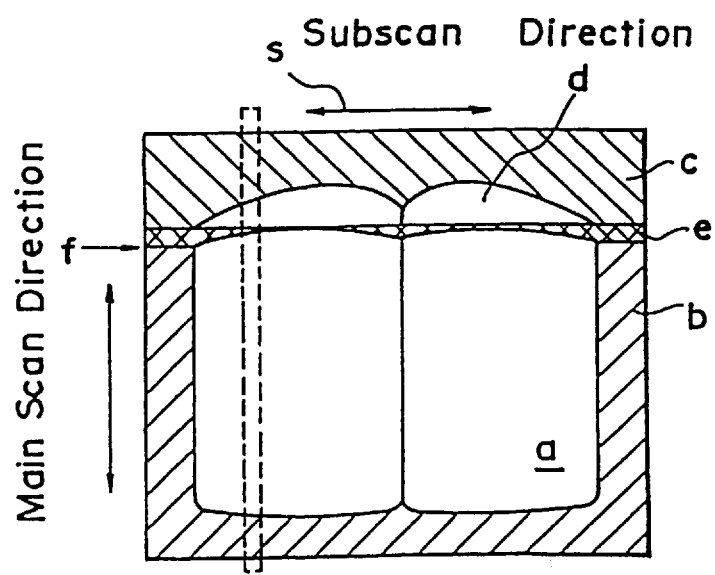
FIG. 6 shows a typical view of the appearance of an image read by means of the line sensor.

FIG. 6 shows the appearance of an image data read by means of the camera device 3 having the above-mentioned construction. In the same figure, "a" indicates the image of the document surface 10a, "b" the image of the platen 2, "c" the image of the background portion reflected on the mirror 6, "d" the side surface image (10d) of the book document 10 reflected on the mirror 6, "e" the image of the reference plate 6A, and "f" the reference position to match the position of the document. The image "a" of the document surface and the image "d" of the document side surface are read as they curve in the main scan direction depending on the change in height of the document. The document surface and the document side surface are normally papers whose color is close to a white color thus are read as a white color. In contrast to this, the quantity of light reflected from the platen 2, the reference plate 6A, which are colored darker than the surface layer of the document, and the image "c" of the background portion reflected on mirror 6 decreases and are read as a black color. Moreover, by inter positioning the image "e" of the reference plate 6A between the image "a" of the document surface and the image "d" of the document side surface reflected by the mirror 6, a distinction can be made between the image "a" of the document surface and the image "d" of the document side surface in the main scan direction.

Figure 7:
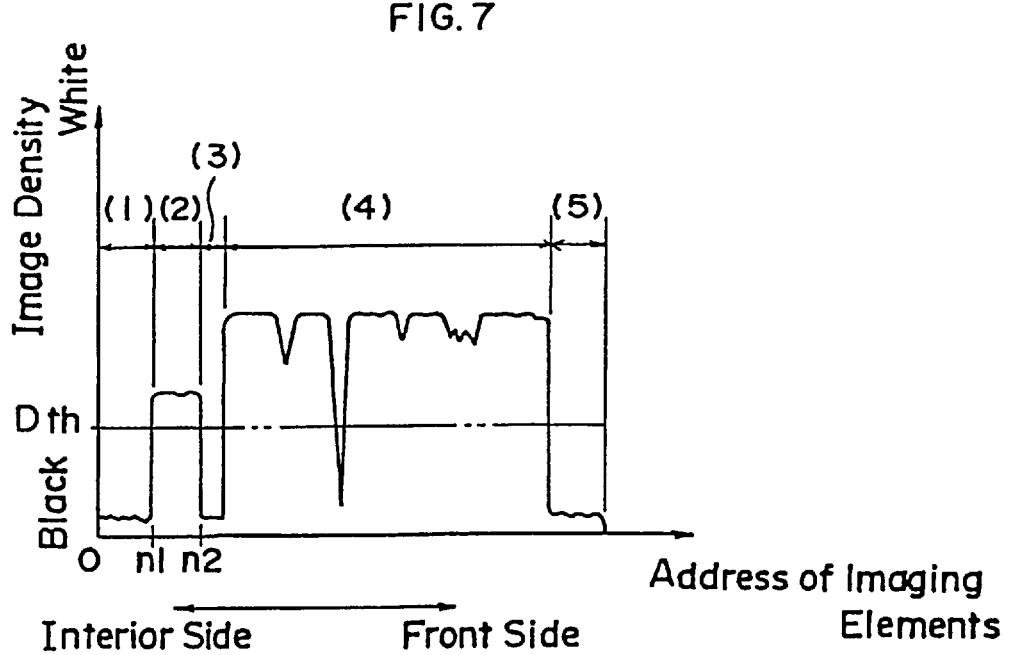
FIG. 7 shows the output level of each element of the line sensor.

FIG. 7 shows the output of one line in the main scan direction that is read in the line sensor. This example shows a case when an image at the position indicated by the dotted line in FIG. 6 is read by the line sensor 8. The abscissa shows the address of the image pickup elements of the line sensor 8 and the ordinate shows the output (density of image) of each image pickup element. In the figure, (1) indicates the image "c" of the background portion reflected on the mirror 6, (2) the image "d" of the side surface of the document reflected on the mirror 6, (3) the image "e" of the surface of the reference plate 6A, (4) the image "a" of the document surface 10a, and (5) the region on the image pickup elements of each image of the image "b" of the platen. Dth is a prescribed threshold value for the purpose of distinguishing the document image or other images. n1 is the smallest address value of the image pickup elements of the output which exceeds the threshold value Dth. In other words, it is a value that indicates the position where image forming will be carried out at the upper edge 10b of the document surface at the image 10d of the document side surface. n2 is the smallest address value within the image pickup elements that read the image of the reference plate 6A and is a fixed value. (n2−n1) is the number of pixels equal to the height of the document used in height detection and changes with a link to the height of the document surface 10a.

When the line sensor 8 scans in the subscan direction, the value of n1 changes in proportion to the height of the document surface at each position of the subscan direction. By this action, height data (n2−n1) which is the number of pixels equal to the height of the document surface at each position of the subscan direction can be obtained. By reading this height data and dividing it by resolution, the document surface height (distance from the document placement surface of the platen 2 to the document surface 10a) can be found.

Concretely, the CPU 23 reads image data that was obtained in the preliminary scan and stored in the image memory 12 in successive line units and then compares the density level of the image data of each pixel every line with the threshold value Dth to obtain n1. The height data found in this way is stored in the memory 18.

(1-4) Image Density Control

In the image reading apparatus 1, density control is carried out that adjusts the density level of the read image data in proportion to the density level of the image portion of the document surface 10a and the density level of the surface of the paper of the document surface 10a. In this density control, the image density control system is switched depending on whether the images of the document surface 10a are character images which form the main characters or halftone images such as photographic images. Whether the document has character images or halftone images is set via inputting by the operator from the control panel 5. When character images are set, a first image density control is executed based on image data read by the preliminary scan and when halftone images are set, a second image density control is executed based on the height of the document surface detected by the height detection previously described.

(1-4-1) First Image Density Control

Figure 9:
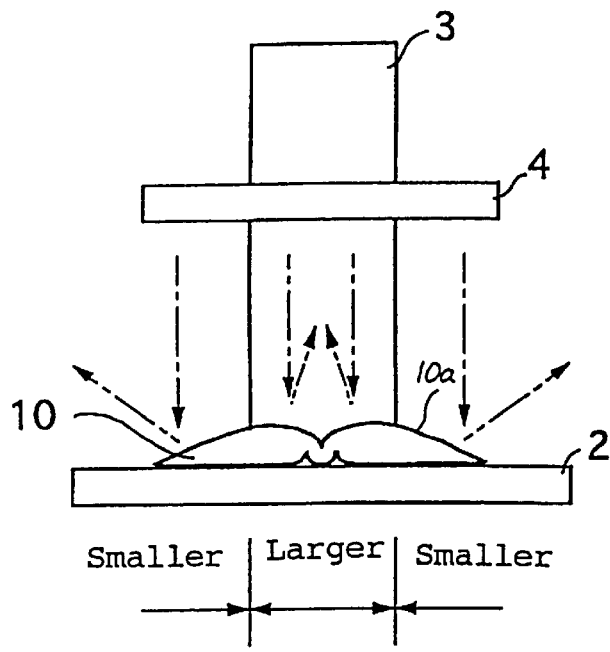
FIG. 9 shows the behavior of light reflected on the document surface of a book document.

At first, the first image density control is described. FIG. 9 is a figure that describes changes in the quantity of light received by the line sensor 8 due to curving of the book document 10. Normally, for the book document 10 placed on the platen 2, the bound portion forms a valley shape and the center portions of both pages form a mountain shape. Hereupon, if the document surface 10a has a high gloss close to the surface of a mirror, the light emitted from the illumination portion 4 and illuminated on the document surface 10a positively reflects on the document surface 10a toward the center of the image reading apparatus 1 at the bound portion and toward the outside of the apparatus 1 at both edges. Because the camera device 3 is located above the center portion of the image reading apparatus 1, the quantity of light received by the line sensor 8 becomes larger at the bound portion of the document and smaller at the both edges of the document. This phenomenon does not occur on documents with a high degree of diffusion such that the light incident to the document is uniformly reflected in all directions. However, the documents on which images are drawn on the surface of the paper such as books or files have some degree of glossiness, and therefore, differences in the quantity of light received occur due to the shape.

Figure 10:
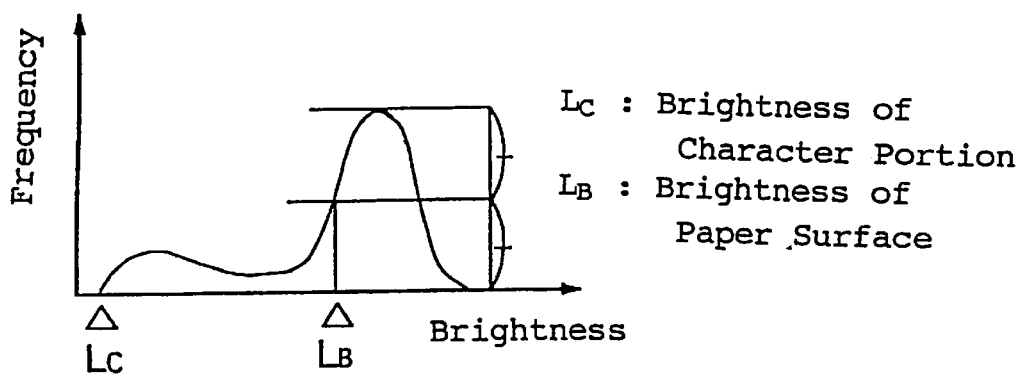
FIG. 10 shows the brightness distribution of one line of image data.

FIG. 10 is a histogram showing the distribution of the brightness level of one line of image data. In the figure, the abscissa shows the brightness level of the image data and the ordinate shows the number of pixels of each brightness level (frequency). In a document with character images, the brightness distribution comprises a normal distribution shape having peaks at a brightness level corresponding to the character portion and a brightness level corresponding to the surface of the paper. Therefore, based on this distribution, the brightness level of the character portion (image portion) and the surface of the paper of the document can be detected. In this embodiment, the lowest brightness level $L_C$ in the distribution and the brightness level $L_B$ that is lower than the peak brightness level and has a frequency ½ the peak value in the brightness distribution of the surface of the paper are detected for the brightness of the character portion, making $L_C$ and $L_B$ as the brightness of the character portion and the brightness of the surface of the paper, respectively.

In the process to detect this brightness level, the CPU 23 reads the image data which was obtained in the preliminary scan and stored in the image memory 12 in units of lines successively, detects the brightness levels $L_C$, $L_B$ for every line, converts these brightness levels to density levels $D_C$, $D_B$ and then stores the density levels in the memory 18. The conversion from brightness levels to density levels is done based on the conversion equation described in the previous logarithm conversion circuit 13.

Figure 11:
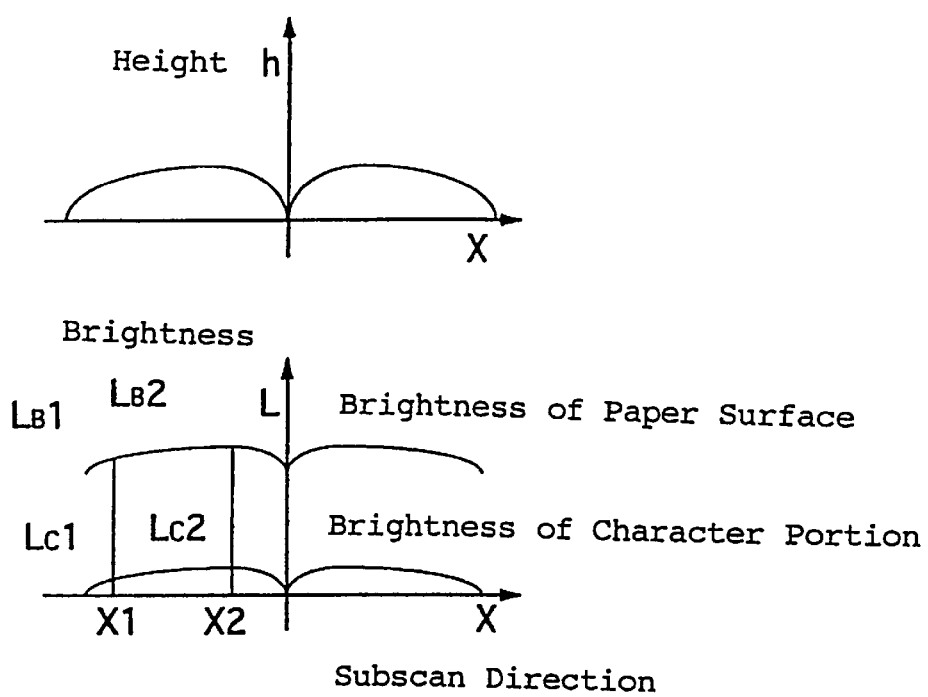
FIG. 11 shows the relationship between the height of the document surface and the brightness level of the document surface.

FIG. 11 shows the relationships among the detected brightness level $L_B$ of the surface of the paper of the document, detected brightness level $L_C$ of the image portion of the document and the height distribution of the document surface obtained by the above-mentioned height detection. Due to the previously described phenomenon using FIG. 9, it is understood that the surface of the paper and brightness levels $L_B$ and $L_C$ of the image portion of the document change linked to changes in the height level.

When the character portion density level $D_C$ and the surface layer density level $D_B$ located at each read position are stored in the memory 18 by means of this type of preliminary scan, during the actual scan, the CPU 23 reads these density levels from the memory 18 and successively transfers them to the density control circuit 15. The density control circuit 15 adjusts the density of the image data in proportion to these density levels.

Figure 12:
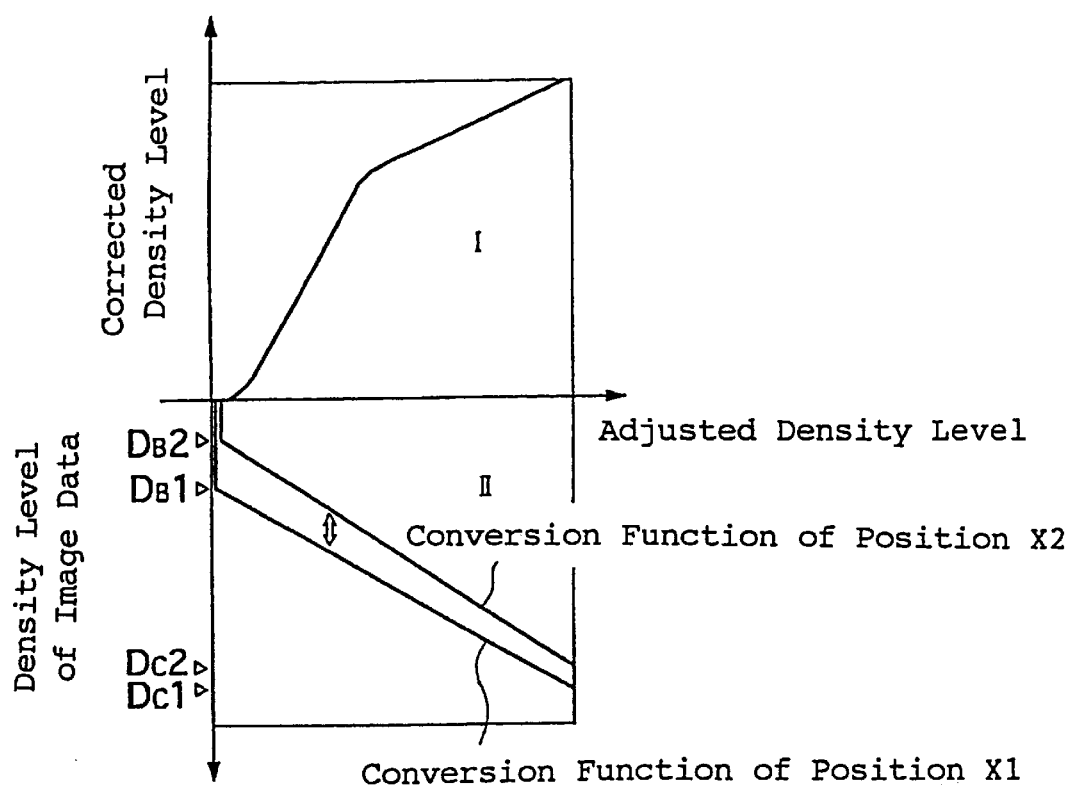
FIG. 12 shows the function of density control carried out in the image reading apparatus.

FIG. 12 is a figure describing the density adjustment of the image data executed by the density control circuit 15. In the figure, the second quadrant indicates the first function used in the density adjustment executed by the density control circuit 15. The ordinate located at the second quadrant indicates the density level of the image data which is input into the density control circuit 15 and the abscissa shows the density level after the density adjustment or, in other words, the density level of the image data which is output from the density control circuit 15.

The density control circuit 15 sets the first function such that the character portion density level $D_C$ is at the maximum density level, making the surface layer density level $D_B$ as a segment based on the character portion density level $D_C$ and the surface layer density level $D_B$ transferred from the CPU 23, and then converts and outputs the image data which is input from the trimming circuit 14 using the first function set as described above. Therefore, by using this density adjustment, the surface of the paper of the document surface 10a is output as white (density 0) image data and the character portion is output as black (maximum density level) image data.

Concretely, as shown in FIG. 11, when the brightness levels $L_B1$ and $L_B2$ of each surface of the paper and brightness levels $L_C1$ and $L_C2$ of the image portion are detected at read positions X1 and X2, the values $D_B1$, $D_C1$, $D_B2$ and $D_C2$ which are the brightness levels $L_B1$, $L_C1$, $L_B2$ and $L_C2$ converted to density levels are transferred to the density control circuit 15. The density control circuit 15 converts the image data at read position x1 obtained in the actual scan using the first function such that level $D_C1$ is at the maximum density level by making the level $D_B1$ as a segment. The circuit also converts the image data at read position X2 obtained in the actual scan using the first function such that the level $D_C2$ is at the maximum density level making the level $D_B2$ as a segment.

By using the above-mentioned process, for example, even documents having document surfaces with gray surface layers such as newspapers will have the image data of the surface of the paper converted to a white level and the image data will be reproduced at the surface layer of the print paper on the printed image. Further, since the above-mentioned image density adjustment is executed at each read position in the subscan direction, the surface layer of the document surface 10a is unified to a white level at each read position and as shown in FIG. 9, changes of the brightness due to curving of the document surface 10a of the book document 10 can be corrected.

The first quadrant of FIG. 12 shows the state of the density conversion of the image data used in the γ correction executed by the γ correction circuit 16. The abscissa in the first quadrant shows the density level of the image data which is input to the γ correction circuit 16, namely, the density level of the image data which is output from the density control circuit 15 and the ordinate shows the density level after the γ correction, namely, the level of the image data which is output from the γ correction circuit 16. In the γ correction, non-linear conversion takes place in response to output characteristics. In this embodiment, to improve the reproducibility of lightly printed characters, the slope of the conversion function at low density regions is raised and to improve the reproducibility of photographic images, the slope of the output density at halftone density regions is reduced.

(1-4-2) Image Density Control of the Second System

Next, the image density control of the second system is described. As for the above-mentioned first image density control, although it is suitable for character images of which the density of the surface of the paper of the document can be detected, it is unsuitable for documents such as photographic images whose entire surface is an image and in which the surface of the paper cannot be read. Therefore, in this embodiment, when halftone images are set by means of the operator's inputting from the control panel 5, the image density control of the second system is executed.

As shown in FIG. 11, the surface of the paper of the document and the brightness level of the image portion change in like manner to changes in the height level due to the quadrant previously described using FIG. 9. Because the brightness level $L_B$ of the surface of the paper and the brightness level $L_C$ of the image portion in a photographic image cannot be detected sometimes, an assumption is made that the document is a surface of paper, and the density levels when that surface of paper which is placed on the platen 2 is read are stored in the memory 18. Furthermore, in a like manner, the density levels when a black image drawn on the surface of paper is read are also stored in the memory 18 and, based on these density levels, the density levels $D_C$ and $D_B$ are calculated in proportion to changes in height.

This calculation is done at each read position in the subscan direction by the CPU 23 and the results stored in the memory 18. The subsequent processes are identical to the previous first image density control. In short, during the actual scan, the CPU 23 reads these density levels from the memory 18 and successively transfers them to the density control circuit 15. The density control circuit 15 adjusts the density of the image data in proportion to these density levels.

(1-5) Control Process

Figure 13:
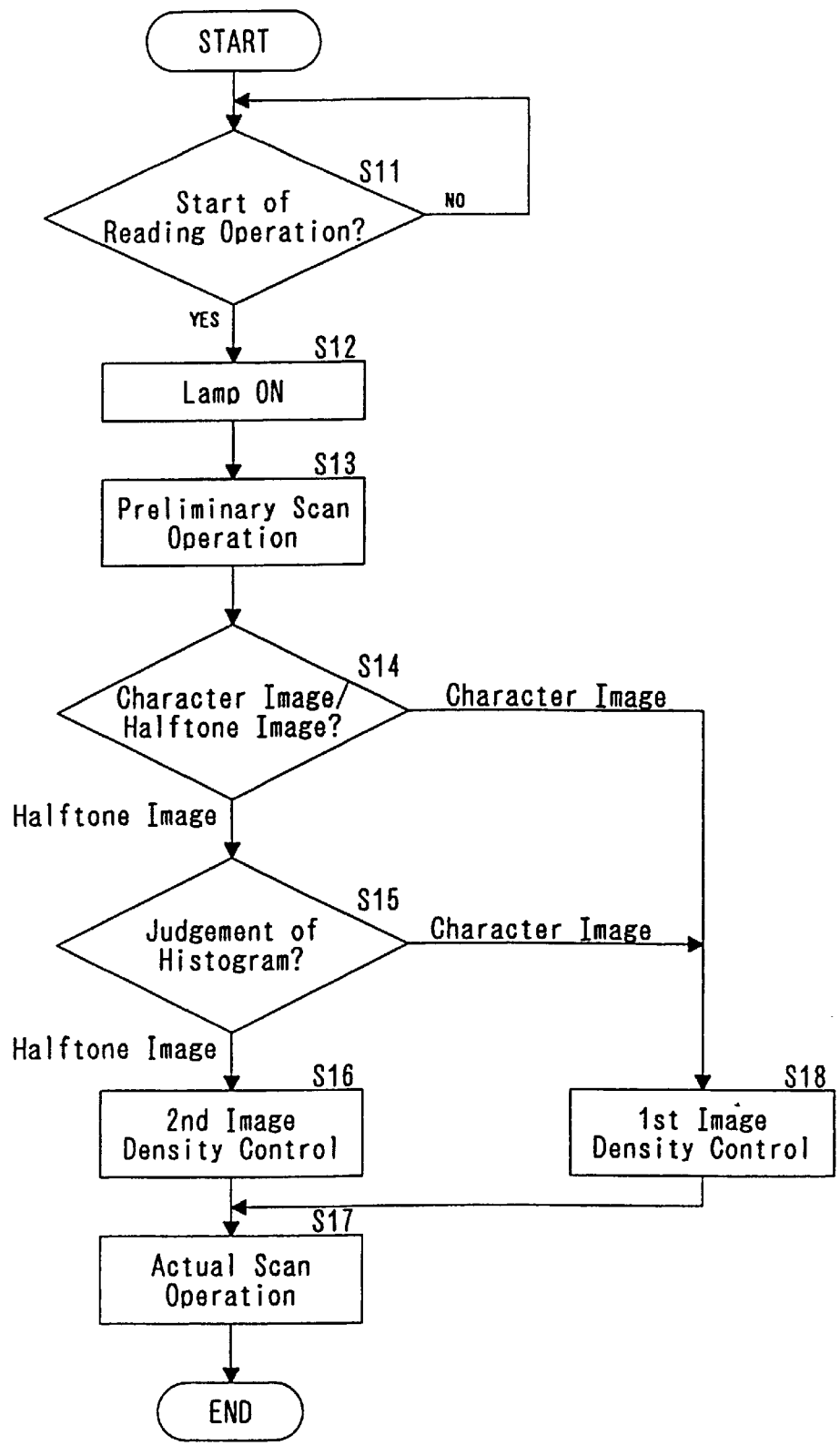
FIG. 13 is a flow chart showing the control process of the image reading apparatus.

FIG. 13 is a flow chart showing the control process executed by the CPU 23. Here, the density control system is changed depending on whether the images of the document surface 10a are character images which form the main characters or halftone images such as photographic images.

When the start of the read operation of the document reading apparatus 1 is indicated by the operator pressing the start button (YES in S11), the CPU 23 outputs control signals to the lamp drive circuit 21, lights the lamp of the illumination portion 4 illuminating the document 10 (S12) and then outputs control signals to the scanning drive circuit 20, moves the line sensor 8 and carries out the preliminary scan operation (S13). By these operations, the image data is stored in the image memory 12 in order of each several lines successively. Next, a judgment is made on whether character images or halftone images are designated from the control panel 5 (S14). When a photographic document is selected, the brightness distribution of the document is checked from the image data in the image memory 12 obtained in the preliminary scan to judge whether the document actually placed on the platen 2 has character images or halftone images (S15). A histogram is created for this judgment that shows the distribution of the number of pixels for every brightness level as shown in FIG. 10. The judgment judges a character image when two peaks appear in the histogram and a halftone image for other cases. When the result of the judgment is a halftone image, the previously described second density control is set (S16), the above-mentioned height detection is executed from the image data stored in the image memory 12 in the preliminary scan and the detected height data is stored in the memory 18. When the preliminary scan completes, the actual scan operation is executed and the density of the image data is adjusted by means of the second automatic density control (S17).

On the other hand, when it is judged as character images in the judgment of S14 or S15, the previously described first density control is set (S18) and the above-mentioned height detection is executed from the image data stored in the image memory 12 in the preliminary scan along with the brightness levels of the surface of the paper and image portions being detected and the detected height data and brightness levels stored in the memory 18. When the preliminary scan completes, the actual scan operation is executed and the density of the image data is adjusted by means of the first automatic density control (S17).

(2) Second Embodiment

In the embodiment previously described, depending on whether character images which form the main characters or halftone images such as photographic images, the density control system was changed. In the second embodiment, the density control system is changed depending on whether the document to be read is a book document or a sheet shaped document with a uniform height.

In other words, because it is necessary to detect the height of the image data attributing the curving of the document surface and then to correct this using the distortion correction circuit 17 when the document is a book document, height detection is essential. Therefore, the image density is adjusted by means of the second density control system using this height data. Moreover, because it is not necessary to obtain the height distribution in a sheet shaped document, the density of the image data is adjusted by means of the first density control system. By this action, when the document is a book document, it is not necessary to detect the brightness data of the image portion and surface of the paper by means of the preliminary scan and when the document is a sheet shape, it is not necessary to detect the height thereby achieving higher process speeds.

Figure 14:
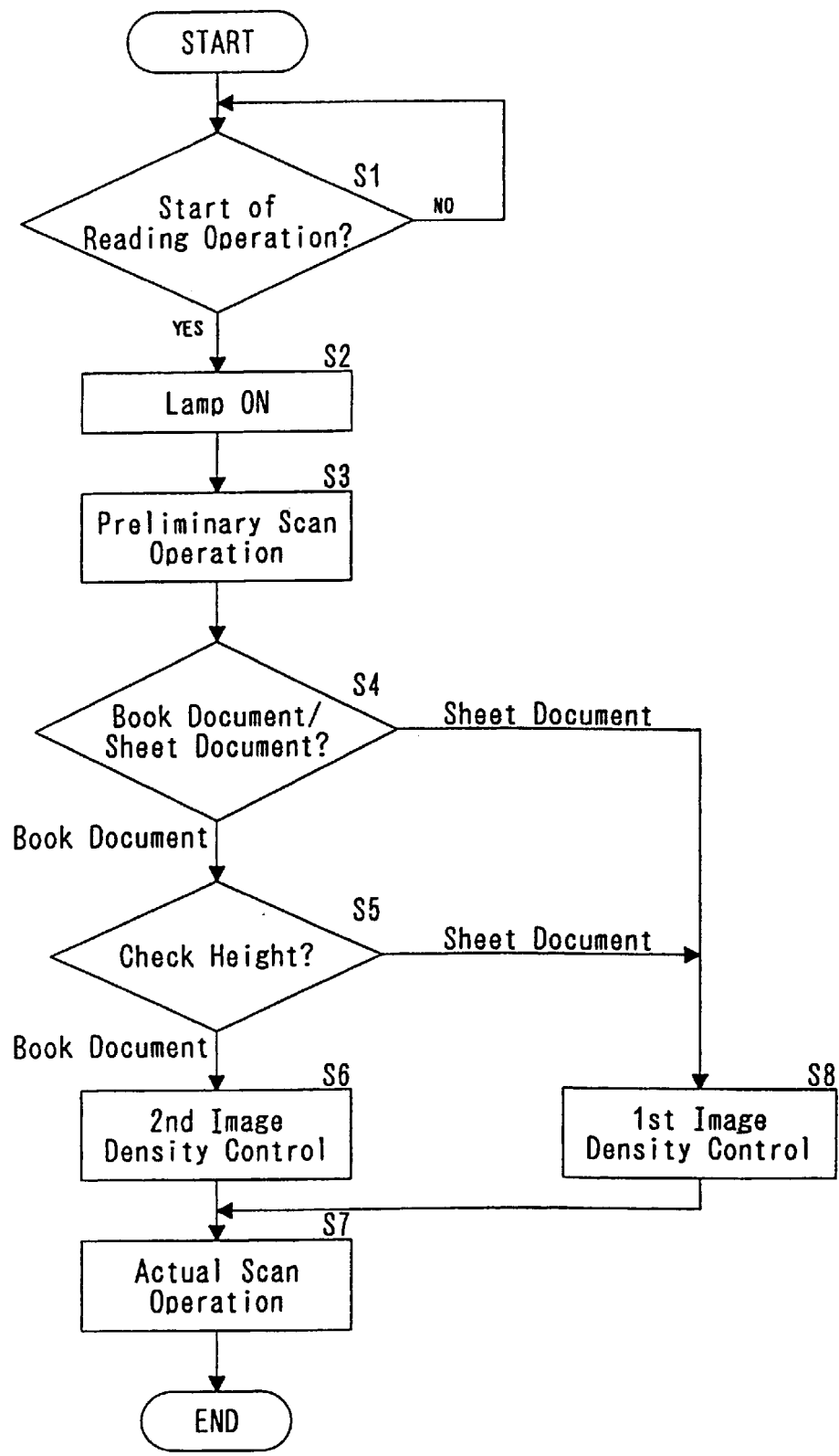
FIG. 14 is a flow chart showing the control process of the image reading apparatus of the second embodiment.

FIG. 14 is a flow chart showing the control process executed in the CPU 23 in the second embodiment. Moreover, in this embodiment the construction is identical to the first embodiment previously described excluding the construction in which the operator selects either a book document or a sheet shaped document from the control panel 5 for the document to be read. Therefore the description of that construction is omitted.

The processes S1 to S3 in FIG. 14 are the same as processes S11 to S13 of FIG. 13. When a judgment is made (S4) that either a book document or a sheet shaped document is designated from the control panel 5 and the book document is selected, the height distribution of the document is checked from the image data in the image memory 12 obtained in the preliminary scan to judge whether the document actually placed on the platen 2 is a book document or a sheet shaped document (S5). When the result of the judgment is a book document, the previously described second density control is set (S6), the above-mentioned height detection is executed from the image data stored in the image memory 12 in the preliminary scan and the detected height data is stored in the memory 18. When the preliminary scan completes, the actual scan operation is executed and the density of the image data is adjusted by means of the second automatic density control (S7).

On the other hand, when a sheet shaped document is judged in the judgment of S4 or S5, the previously described first density control is set (S8) and the above-mentioned height detection is executed from the image data stored in the image memory 12 in the preliminary scan along with the brightness levels of the surface of the paper and image portions being detected and the detected height data and brightness levels stored in the memory 18. When the preliminary scan completes, the actual scan operation executes and the density of the image data is adjusted by means of the first automatic density control (S7).

(3) Third Embodiment

In the first embodiment previously described, the density control system was changed depending on whether character images which form the main characters of the image or halftone images such as photographic images. Furthermore, in the second embodiment, the density control system changed depending on whether the document to be read is a book document or a sheet shaped document with a uniform height. In contrast to this, in the third embodiment, the first density control system is executed with a priority and when the noise component is contained in the density levels $L_B$ and $L_C$ which were detected and used in the first density control system is over the allowable range, the density will be executed by means of the second density control system.

Figure 15:
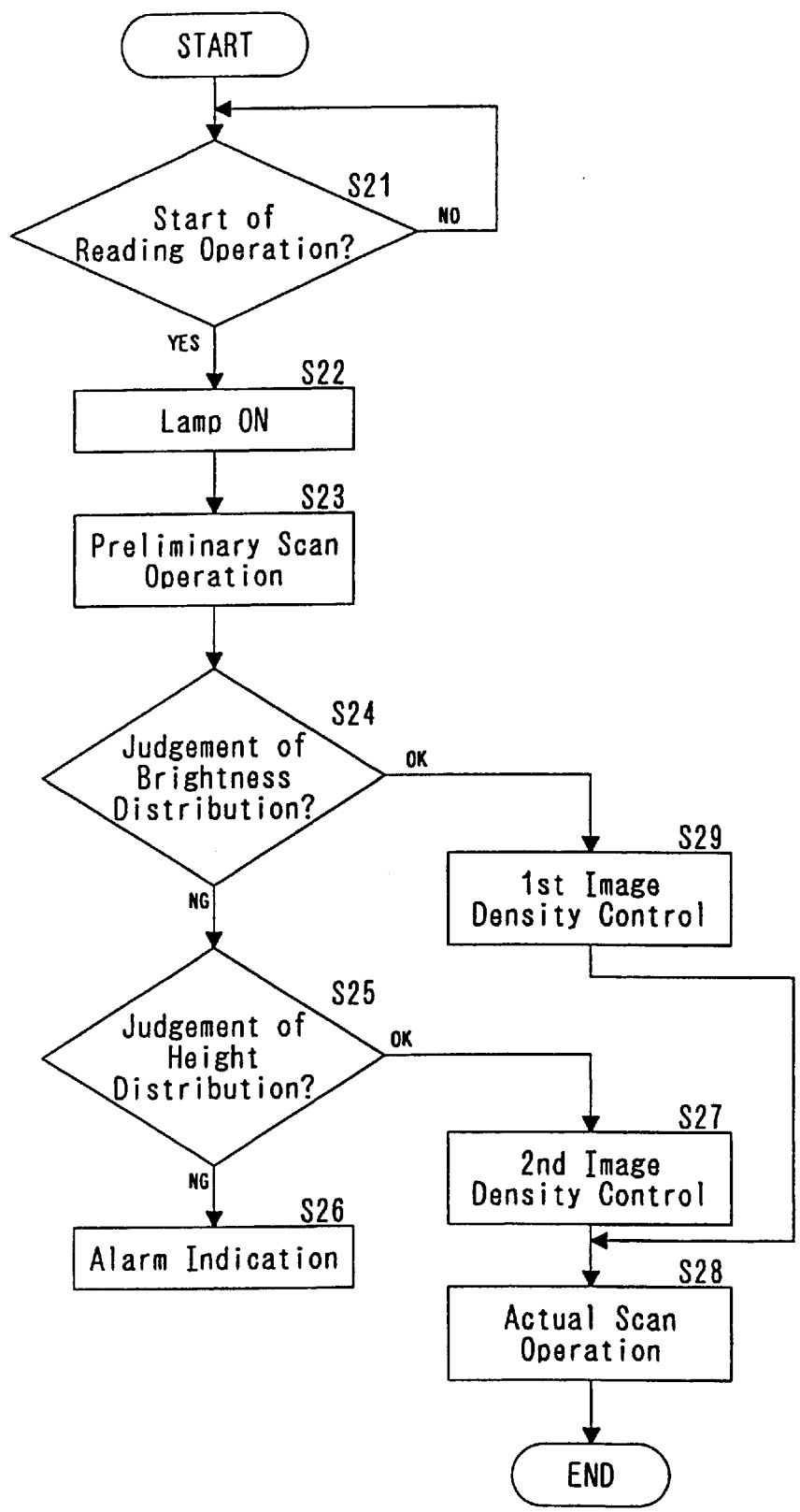
FIG. 15 is a flow chart showing the control process of the image reading apparatus of the third embodiment.
Figure 16:
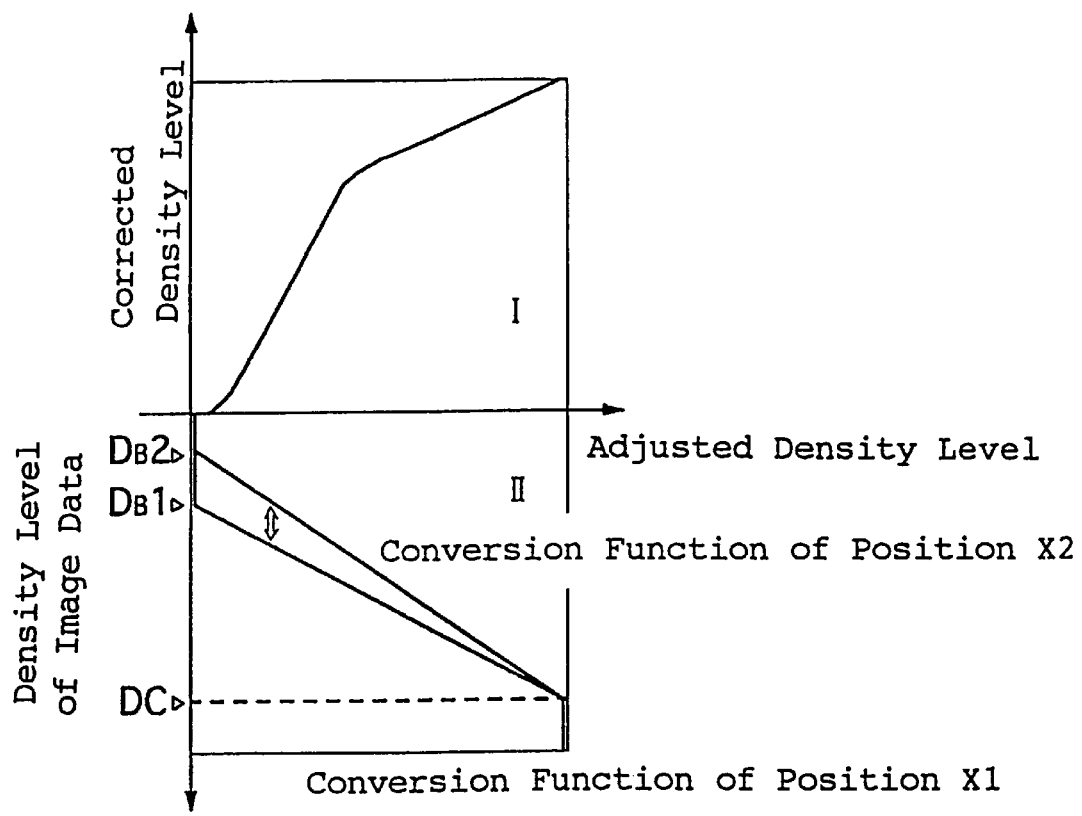
FIG. 16 shows a variation example of the density control carried out in the image reading apparatus.

FIG. 15 is a flow chart showing the control process executed in the CPU 23 in this third embodiment. Moreover, in this embodiment the construction is identical to the first embodiment excluding the control process shown in FIG. 15 therefore the description of that construction is omitted.

The processes S21 to S23 in FIG. 15 are the same as processes S11 to S13 of FIG. 13. In these processes, the image data which was obtained in the preliminary scan and is stored in the image memory 12 is read line-by-line, the brightness level $L_B$ of the surface of the paper and the brightness level $L_C$ of the image portion at each read position in the subscan direction are detected and a judgment (S24) made on whether or not there is a non-contiguous portion in the distribution of each brightness level. This judgment judges it as a non-contiguous portion or, in other words, data containing noise when calculating the difference between the first and last brightness level and the calculated value exceeds the prescribed value. When there is a non-contiguous portion or, namely, when noise is contained in the detected brightness level, in like manner, the height distribution of the document is checked from the image data in the image memory 12 and judges whether or not there is a non-contiguous portion in the height distribution (S25). If it is judged that a non-contiguous portion exists in the height distribution and noise is contained in the height detection as well, it is deemed impossible to carry out the density control and executes an alarm indications (S26). Conversely, when a non-contiguous portion does not exist in the brightness level (S24 YES), the previously described first density control is set (S29), the actual scan operation is executed and the density of the image data is adjusted by means of the first automatic density control (S28). Further, when a non-contiguous portion does not exist in the height distribution (S25 YES), the previously described second density control is set (S27), the actual scan operation is executed and the density of the image data is adjusted by means of the second automatic density control (S28).

These actions make it possible to adjust the density of image data to an optimum level without receiving the effects of noise in the third embodiment.

(4) Variation Example

In the above-mentioned first density control system, although the density level $D_B$ of the surface of the paper and the density level $D_C$ of the image portion were set and the densities adjusted at each read position in the subscan direction, the density-level $D_C$ can be a fixed value. Namely, in a document with character images forming the main characters, when there are either no pixels corresponding to the character portion or a very small amount of pixels depending on the read position, there is a chance the brightness level of the image portion will not be able to be detected. Therefore, as shown in FIG. 11, the density level $D_C$ of the character portion can be set at a fixed value, only the density level $D_B$ of the surface of the paper detected and the resulting value transferred to the density control circuit 15.

Figure 17:
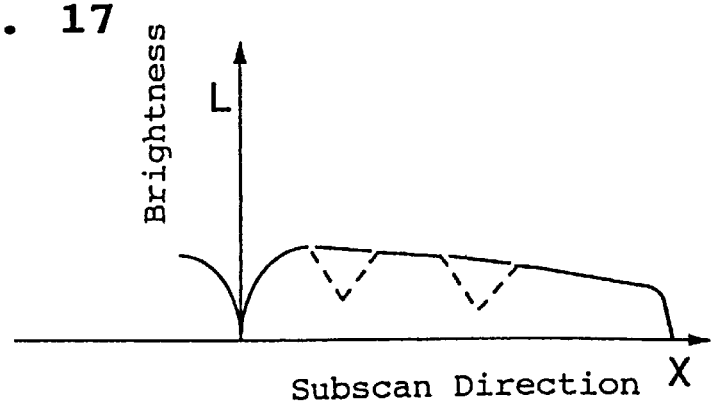
FIG. 17 shows the behavior of noise generated in the brightness level of the document surface.

Furthermore, although the third embodiment is one in which the density control system is changed depending on whether or not there is noise, any detected noise can be corrected by means of processing by the CPU 23. FIG. 17 shows the brightness level of the document surface in the subscan direction becoming a non-contiguous portion (broken lines) due to the effects of noise. For this type of case, the noise is eliminated. For example, depending on the read position, when no characters are written on the document surface or when a picture extends across the entire surface, there is a possibility these data lines will be non-contiguous. For this type of case, the CPU 23 carries out a smoothing process by deleting the non-contiguous portion. Concretely, utilizing the contiguousness of the data, data which separated from the first and last data value more than a fixed distance is deleted and an average value of first and last data is used in its place. However, because the height of the document changes non-contiguously in the bound portion of the document, there is a high possibility the brightness level will also become non-contiguous. At this type of area, averaging is not carried out. When the actual scan operation is executed, using the brightness level completed in the above-mentioned process, the density of the image data is adjusted by the density control circuit 15.

Moreover, because it is understood as described in FIG. 11 that there is a fixed correlation between the brightness level and the height distribution of the document surface, it is also possible to use the height data detected while correcting the noise component. For this case, it is also possible to eliminate the noise in a non-contiguous portion such as the bound portion of the document. Concretely, based on the height data of the document, the bound portion of the document, the highest point of the document and the edge portion are detected. Then, based on this data, the region in which the brightness changes is broken up into three portions: 'increase', 'decrease' and 'no change', allowing the data opposite to the direction of these to be eliminated as noise.

Even further, three conditions were described for the purpose of changing the first density control and the second density control in the above-mentioned embodiments. The first embodiment deemed types of images (character images or halftone images) as a condition, the second embodiment deemed types of documents (book documents or sheet shaped documents) as a condition, and the third embodiment deemed whether or not there is noise as a condition. In addition to these, the controls can be changed by various other conditions and further, combinations of these conditions can also be used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus comprising:

an image reader which reads an image of a document to output image data;

an image detector for generating correction density signals including an image density signal based upon the density of the document image and a height signal based upon the height of the document;

a density control means for receiving one of said correction density signals from said image detector to adjust the quality of the read image data; and a selection means for selecting an appropriate correction density signal to transfer to said density control means so that the image data outputted by said image reader is adjusted.

2. The image reading apparatus as claimed in claim 1 wherein said image detector respectively detects the density of the background portion of the document image and the density of the image portion of the document image.

3. The image reading apparatus as claimed in claim 2 wherein said image detector detects the density of the background portion and the density of the image portion from the image data outputted by said image reader.

4. The image reading apparatus as claimed in claim 3 wherein said image detector prepares a histogram showing the distribution of the density level of the image data and detects the density of the background portion and the density of the image portion based on peaks which appear in said prepared histogram.

5. The image reading apparatus as claimed in claim 1 wherein said density control means presumes density of the document image based on the document height detected by said image detector and adjusts the density level of image data based on the presumed density.

6. The image reading apparatus as claimed in claim 1 wherein said selection means includes a control panel and selects the signal generated by said image detector based upon an input from said control panel.

7. The image reading apparatus as claimed in claim 6 wherein said control panel inputs the type of the document image to be read.

8. The image reading apparatus as claimed in claim 6 wherein said control panel inputs the shape of the document to be read.

9. An image reading method comprising steps of:

reading an image of a document to output image data;

detecting the density of the document image and the height of the document;

generating correction density signals including an image density signal based upon the detected density and a height signal based upon the detected height;

selecting an appropriate correction density signal to transfer to a density control circuit;

transferring the thus selected correction density signal to said density control circuit; and adjusting density of the image data based on the selected correction density signal.

10. The image reading apparatus as claimed in claim 1 wherein said selection means includes a judgment means for judging the type of document image and selecting one of said image density signal or height signal to provide an input signal to the density control means based upon the judgment of said judgment means.

11. The image reading apparatus as claimed in claim 10 wherein said selection means selects one of the image density signal or the height signal if said judgment means determines the image type is a character image or a halftone image, respectively.

12. The image reading apparatus as claimed in claim 1 wherein said selection means includes a judgment means for judging the shape of the document and wherein said selection means selects the signal for input into the image density control means from one of the image density signal or the height signal based upon the judgment of said judgment means.

13. The image reading apparatus as claimed in claim 12 wherein said selection means assists in the selection of the image density signal when said judgment means judges that the document surface is flat, and selects the height signal when said judgment means judges that the document surface is curved.

14. The image reading apparatus as claimed in claim 1 wherein said selection means includes a noise detection means for detecting the noise level contained in the scanned image to assist in the selection of one of the image density signal or height signal.

15. The image reading apparatus as claimed in claim 14 wherein said selection means uses the detected noise level to select one of the image density signal or height signal based upon a comparison of the noise level to an allowable range.

16. The image reading method as claimed in claim 9 wherein said selection step includes a manual input of the type of document to be read.

17. The image reading method as claimed in claim 9 wherein said selection step includes judging the type of document image read and selecting the appropriate correction density signal based upon such judgment.

18. The image reading method as claimed in claim 17 wherein the selection step is performed based upon a determination of a character image or a halftone image in the judging step.

19. The image reading method as claimed in claim 9 wherein said selection step includes judging the shape of the document.

20. The image reading method as claimed in claim 19 wherein the selection step selects the image density signal if the document surface is flat or selects the height signal if the document surface is curved.

21. The image reading method as claimed in claim 9 wherein said selection step includes steps of detecting noise levels contained in the detected document as compared to the image density signal and the height signal.

22. The image reading method as claimed in claim 21 wherein the selection step includes comparison of the detected noise level to an allowable range.

* * * * *